J. F. GILL AND J. N. CHAVIARA.
CONSECUTIVE OPERATION OF TWO OR MORE MECHANISMS.
APPLICATION FILED FEB. 26, 1919.

1,383,098.

Patented June 28, 1921.

Inventors
J. F. Gill.
J. N. Chaviara
By H. R. Kerslake
Atty

J. F. GILL AND J. N. CHAVIARA.
CONSECUTIVE OPERATION OF TWO OR MORE MECHANISMS.
APPLICATION FILED FEB. 26, 1919.

1,383,098.

Patented June 28, 1921.

Inventors
J. F. Gill
J. N. Chaviara
By H. R. Kerslake.
Atty.

UNITED STATES PATENT OFFICE.

JAMES FRANCIS GILL AND JOHN NICHOLAS CHAVIARA, OF LIVERPOOL, ENGLAND.

CONSECUTIVE OPERATION OF TWO OR MORE MECHANISMS.

1,383,098.  Specification of Letters Patent.  Patented June 28, 1921.

Application filed February 26, 1919. Serial No. 279,371.

*To all whom it may concern:*

Be it known that we, JAMES FRANCIS GILL and JOHN NICHOLAS CHAVIARA, subjects of the King of Great Britain and Ireland, residing at 25 Castle street, Liverpool, England, have invented certain new and useful Improvements Relating to the Consecutive Operation of Two or More Mechanisms, of which the following is a specification.

This invention relates to the consecutive operation of a pair of electrically connected mechanisms arranged at a distance apart, and has for its object to provide improved means whereby each movement of an electromagnetically operated oscillatory member in one mechanism is immediately followed by a movement of a like member in the other mechanism. This invention is adapted for use in telegraphs for the transmission of signals or messages. When desired the movements of the oscillatory members are converted into angular or rotational movements of an index movable over a dial.

The invention comprises the employment in each of a transmitting instrument and a receiving instrument, of an electromagnet system, and an oscillator movable under the influence of the said system, and means whereby the oscillator of each instrument in turn can short circuit a portion of the oscillator operating system of the other instrument for producing consecutive movements of the oscillators.

Figure 5:
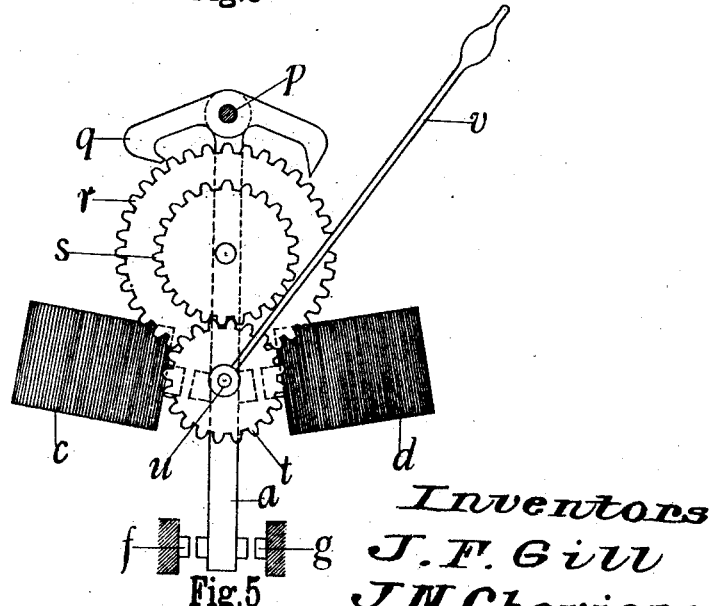

Figures 1–4 illustrate diagrammatically various systems for carrying the invention into effect. Fig. 5 illustrates diagrammatically a device for operating a rotatable index from an oscillator.

Figure 1:
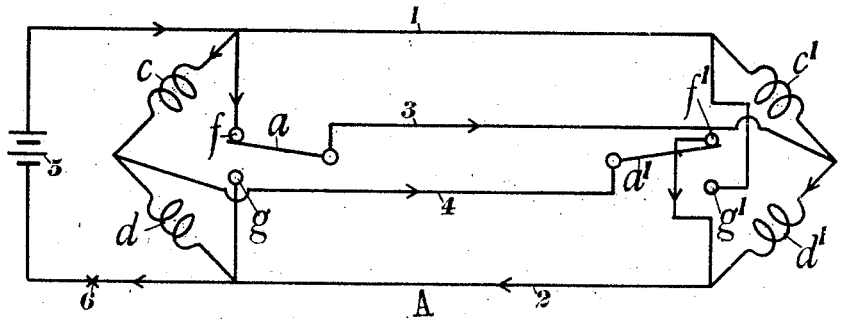
Figure 1:
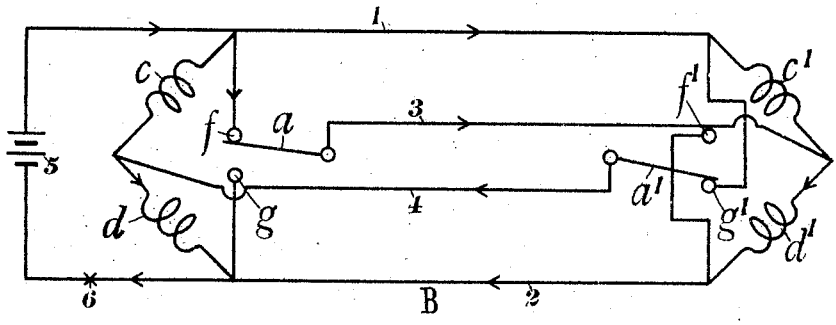
Figure 1:
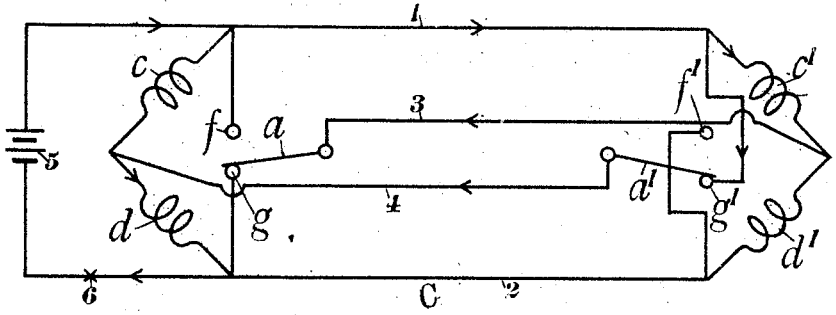
Figure 1:
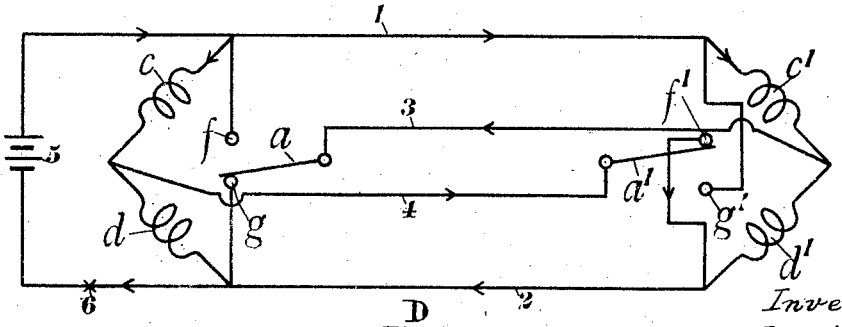

The electrical connections for the simplest case employing a pair of magnets in each instrument are as shown in Fig. 1. In this figure the four diagrams A. B. C. and D. illustrate the steps in one cycle of operations.

The two electro-magnets $c$ and $d$ of the transmitter are connected in series with each other, as are also the electro-magnets $c'$ and $d'$ in the receiver; further the four electro-magnets with two line wires 1. 2 form a completely closed electrical circuit. In the transmitter, the mid-point between the two electro-magnets is connected by a line wire 4 to the oscillator $a'$ of the receiver, and the contacts $f'$ $g'$ which limit the motion of the receiver oscillator $a'$ are connected respectively to the line wires connected to the outer ends of the two electro-magnets $d'$ $c'$. In the receiver, the mid-point between its two electro-magnets $c'$ $d'$ is connected by a line wire 3 to the oscillator $a$ of the transmitter and the contacts $f$ $g$ which limit the motion of the transmitter oscillator $a$ are connected respectively to the line wires connected to the outer ends of the electro magnets $c$ $d$. But there is this difference between the two instruments, namely that the connections between the contacts and the ends of the magnets are in the one instrument the reverse of the corresponding connections in the other instrument. From the foregoing it will be understood that there are four leads connecting the transmitter with the receiver. Also it will be understood that the oscillators receive their movements from the adjacent electro-magnets.

If a battery 5 at the transmitter end is connected through a switch 6 to the two outer terminals of the transmitter electromagnets, then when the switch is closed a current passes through the magnets at each end of the line, those in the transmitter being in parallel with those in the receiver. All four magnets (if alike in form) would be equally excited, but owing to the fact that the oscillators $a$ $a'$ are in one or other of the extreme positions, one of the magnets at each end of the line is short circuited through the contact at the opposite end. The effect is that the remaining magnet at each end has a greater potential difference across its terminals and is therefore more fully excited, and the short circuited magnets have no magnetism. Starting with the oscillators in the position shown in diagram A (Fig. 1) both oscillators are in the position which for convenience may be termed the upper position. The magnets $d$ and $c'$ are short circuited. The magnets $c$ and $d'$ being excited the effect of $c$ on $a$ is to pull it tighter on to the contact $f$, while the effect of $d'$ on $a'$ is to pull it down on to the lower contact $g'$ as shown in diagram B. As soon as this occurs the transmitter magnet $c$ is short circuited and $d$ is excited, whereupon the oscillator $a$ is pulled down on to $g$ as shown in the diagram C. Likewise the receiver magnet $d'$ is now short circuited and the magnet $c'$ excited with the result that $a'$ is pulled up to the contact $f'$ as shown in diagram D. This alternate action of the oscillators will continue so long as the current is applied to the circuit. Neither oscillator can make a fresh movement until its counter-part at the other end of the line has completed a similar movement and consequently the total number of movements made by each oscillator must under all conditions be exactly alike.

If each oscillator is mechanically coupled to a wheel or index so that each movement causes the wheel or index to advance in the same direction through a definite distance then these indices will always keep in step or be synchronized. To enable the apparatus to be used for the purposes of the invention, the switch at the transmitter end could be closed by hand and when the index on the transmitter had reached a definite mark on the dial the current could be switched off. Since the two indices are in synchronism the operator would always be sure that the index at the receiver end would be at the similar mark on that dial. Fig. 5 shows a simple device for actuating a rotatable index from an oscillator. On the arbor $p$ of an oscillator is secured an escapement pawl $q$ which can impart intermittent movements to an escapement wheel $r$. The wheel carries with it a pinion $s$ which gears with a pinion $t$ on the arbor $u$ of an index $v$ over a dial. The oscillator is indicated by $a$, its electromagnets by $c$, $d$ and the contacts under the control of the oscillator by $f$, $g$.

Figure 2:
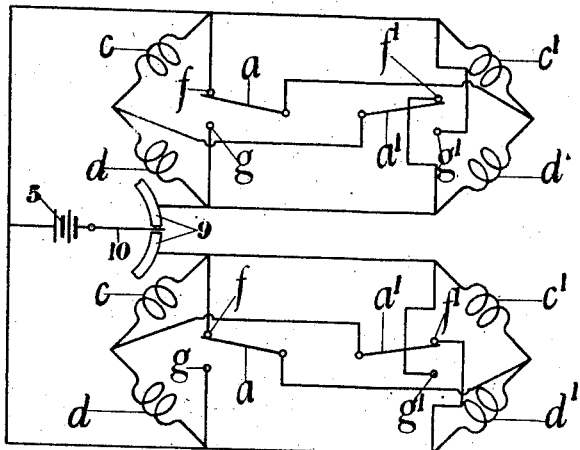

In the above described arrangement the oscillator moves the index in one direction only. If it is desired to reproduce synchronously the movement of an index which may rotate in either direction we provide a system as shown in Fig. 2. This system involves the use of two oscillators in both the transmitter and the receiver, one of which can produce a movement of an index in one direction and the other a movement in the opposite direction. One oscillator in both transmitter and receiver is out of action when the other is in action.

Figure 3:
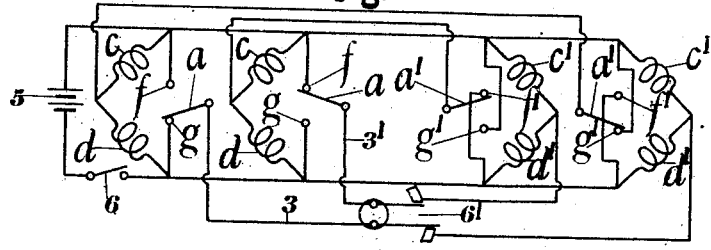

The wiring of the system shown in Fig. 2 can be simplified as shown in Fig. 3. The battery circuit is controlled by the switch 6, and in the line wires 3 3' connecting the transmitter oscillators to the mid points of the receiver magnet systems a switch 6' is provided. This switch is coupled to the switch 6 so that when the latter is operated either the circuit of wire 3 or that of the wire 3' is also completed.

When more than one receiver is required to operate from one transmitter, the extra receivers are connected so that their electro-magnet circuits are in parallel with the first receiver but their short circuiting leads $i.$ $e.$ those to the oscillator contacts and to the mid point of the magnets are arranged to be in series with each other. By this means we insure that none of the oscillators can make a second movement until every one of them has completed the first movement.

If more than one transmitter is to be connected up to one or more receivers then the connections are made in exactly the same way as for multiple receivers $i.$ $e.$ all the magnet circuits are in parallel and the short circuiting wires in series. An extra lead from the battery is taken to each of the transmitters so that the current can be switched on at any one of them.

In the above described arrangements a pair of electro-magnets are employed in both the transmitters and the receivers. It is not essential to employ two magnets in each instrument as the movement of the oscillator may be produced in one direction by a magnet and the opposite movement by a spring.

Figure 4:
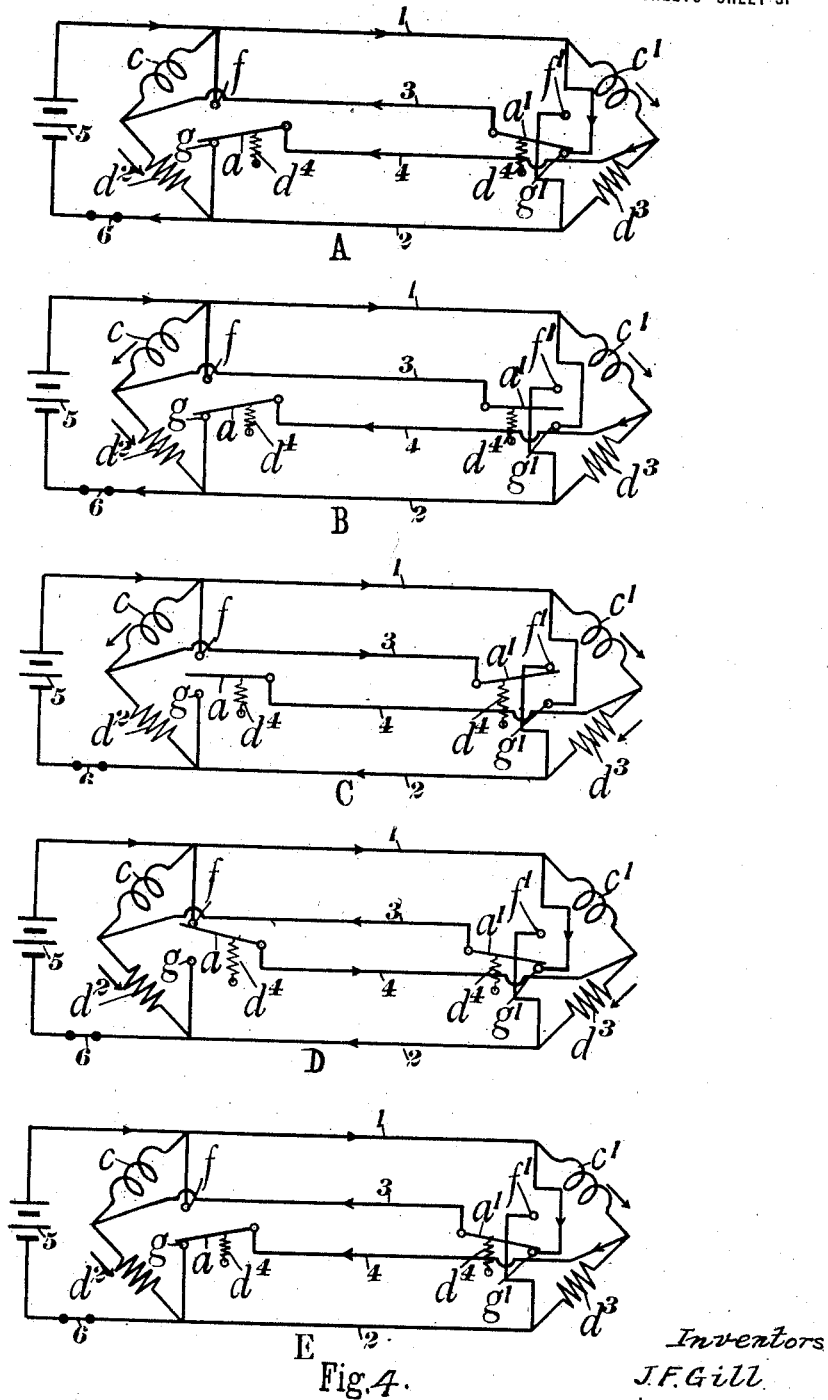

In Fig. 4, A, B, C, D and E are diagrams illustrating the stages in the operation of a simple system in which a single magnet is provided in the transmitter and the receiver. From the diagrams it will be evident that the elements in the system are similar to those shown in Fig. 1, excepting that in place of the magnets $d$, $d'$ resistances $d^2$, $d^3$ are used. Acting on each oscillator is a spring $d^4$. In other respects the systems are alike and the same reference letters as those previously employed are used to designate the parts. Starting with A, the oscillators $a$ $a'$ are pulled by their springs against the lower contacts $g$ $g'$. On closing the switch 6 the magnet $c'$ is excited, the magnet $c$ remaining inactive on account of its being short circuited. The resistance $d^3$ being also short circuited the magnet $c'$ exerts it maximum pull and lifts the oscillator $a'$ off the lower contact $g'$ as shown at B, $c'$ is still fully excited and in consequence $a'$ continues to move up toward $f'$ but $c$ which was formerly inactive is now magnetized to about one half its maximum strength. No movement is, however, imparted to $a$ as the magnet $c$ is not yet sufficiently excited. As soon as $a'$ reaches $f'$ the resistance $d^2$ is short circuited. $c$ now receives full current and $a$ commences to move as shown at C. Immediately $a$ leaves the contact $g$ the pull of $c'$ falls to about one half. This is however sufficient to hold $a'$ in contact with $f'$. Meanwhile $a$ rises into contact with $f$ and now $c'$ is short circuited with the result that $a'$ moves back to $g'$ under the action of its spring as shown at D. As soon as $a'$ touches $g'$ it short circuits $c$ and $a$ is pulled over to $g$ by its spring as shown at E. This completes the cycle and the process is then repeated so long as current is supplied to the system.

The invention is not limited to the systems above described, nor to any particular mechanical means for use with the same as these may be varied to meet different requirements. In the foregoing the instruments have been distinguished by the terms transmitters and receivers. It is evident that each instrument may be adapted to be used both as a transmitter and a receiver.

Having thus described our invention what we claim as new and desire to secure by Letters Patent is:—

1. In electrical means for the consecutive operation of two or more mechanisms, the combination comprising transmitting and receiving instruments, an electro-magnet system and an oscillator movable under the influence of said system in each instrument, a source of electric current, means connecting the said source and the magnet systems of the instruments, and means whereby the oscillator of each instrument in turn can short circuit a portion of the oscillator operating system of the other instrument for producing consecutive movements of the oscillators, substantially as described.

2. In electrical means for the consecutive operation of two or more mechanisms, the combination comprising transmitting and receiving instruments, a pair of electro-magnets in series and an oscillator movable in opposite directions by the said magnets in each instrument, a source of current, means connecting the said source and the magnets of the instruments, and means whereby the magnets of each instrument are alternately short circuited by movement of the oscillator in the complementary instrument and each movement of the oscillator in one instrument is followed by a movement of the oscillator in the complementary instrument, substantially as described.

3. In electrical means for the consecutive operation of two or more mechanisms, the combination comprising transmitting and receiving instruments, a pair of electro-magnets in series and an oscillator actuated by the magnets in each instrument, a source of electric current, means connecting the said source and the opposite ends of the magnets of the instruments in parallel, contacts connected to the opposite ends of the two magnets in each instument, and means whereby under the action of the oscillator the contacts of each instrument are alternately connected to a point between the magnets of the complementary instrument, substantially as described.

4. In electrical means for the consecutive operation of two or more mechanisms, the combination comprising transmitting and receiving instruments, a pair of electro-magnets in series and an oscillator actuated by the magnets in each instrument, a pair of fixed contacts and a pair of movable contacts in each instrument, the latter being actuated by the oscillator, a source of electric current, conductors whereby the said source and the magnets of all the instruments are connected in parallel, and means whereby under the action of the oscillator on the fixed and movable contacts in each instrument the magnets in the complementary instrument are alternately short circuited, substantially as described.

In testimony whereof we have signed our names to this specification.

JAMES FRANCIS GILL.
JOHN NICHOLAS CHAVIARA.

Witnesses:
 Wм. Pierce,
 Joseph Flack.